(No Model.)

M. ASHE.
REED FOR LOOMS.

No. 262,197.  Patented Aug. 8, 1882.

Witnesses
Richard A. Healy
Kittie Inglis

Inventor
Mathew Ashe
John Inglis atty

UNITED STATES PATENT OFFICE.

MATHEW ASHE, OF PATERSON, NEW JERSEY.

REED FOR LOOMS.

SPECIFICATION forming part of Letters Patent No. 262,197, dated August 8, 1882.

Application filed January 25, 1882. (No model.)

*To all whom it may concern:*

Be it known that I, MATHEW ASHE, a citizen of the United States, residing at Paterson, Passaic county, State of New Jersey, have invented a new and useful Improvement in Reeds for Looms, of which the following is a specification, reference being had to the accompanying drawings, forming a part thereof.

My invention relates to an improvement in reeds, such as are used in looms for separating the strands of the warp in weaving fabrics, and has for its objects the production of a reed in which the separating dents, reeds, or blades are securely held in their several positions, but can, when broken, be replaced by by duplicate blades without disturbing the other separating-blades of the reed. I attain these objects in the manner illustrated in the accompanying drawings, in which—

Figure 1:
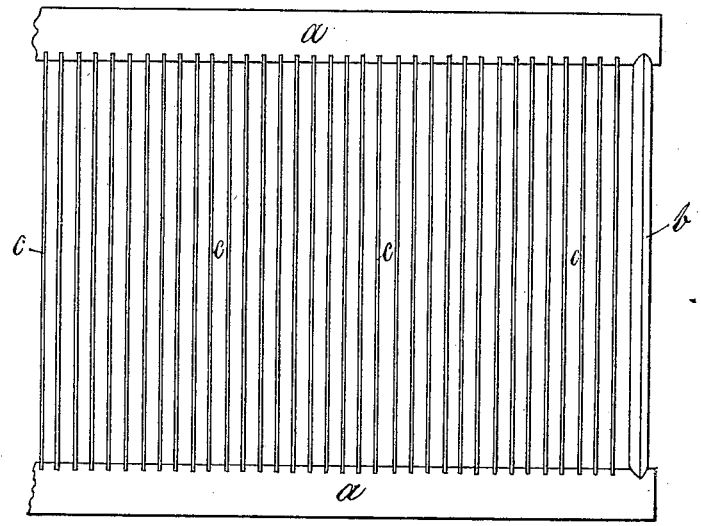
Figure 2:
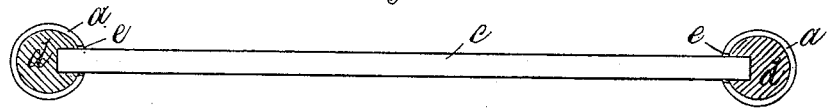
Figure 3:
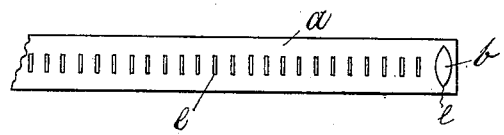

Figure 1 is a front view of a section of my improved reed, showing several separating dents or blades in position in the supporting-tubes. Fig. 2 is a cross-section of the same, and Fig. 3 is a view of one of the tubes, showing the arrangement of the slots therein.

$a\ a$ represent two metal tubes, having smooth exteriors. One side of each tube $a$ has slots $e$ formed in it in size and number suitable for the size and number of separating dents or blades $c$ to be inserted therein.

$b$ represents a protecting-rod, that is arranged near the ends of the tubes to protect the separating-blades from injury from the shuttle.

$d$ represents the filling material in the tubes, which may be of any soft substance, such as lead, resin, &c.

The separating dents or blades $c$ and rods $b$ are inserted in the tubes $a$ through the slots $e$, and when the blades $c$ and protecting-rods $b$ are all suitably arranged in the tubes $a$ the lead, resin, or other suitable substance in a melted or fluid state is poured in the ends of the tubes until the tubes $a$ are filled with the substance used. The substance thus used in its melted and fluid state forms itself around the ends of the dents or blades $c$ and protecting-rods $b$, holding them securely in their several positions. When any of the separating-blades $c$ are broken by accident or otherwise, the broken blades can be easily drawn out of the tubes $a$ and duplicate reeds or blades inserted by simply removing with a sharp instrument enough of the soft substance from the end of the bed of the broken blade in one of the tubes $a$ to allow the duplicate dent or blade $c$ to enter, until the same by being bent can be sprung in the other tube at its opposite end. The operation of removing a broken blade and inserting a duplicate will occupy but a moment of time.

By this my invention much inconvenience and expense are avoided.

A broken blade in reeds as they are now constructed is attended with considerable difficulty in having it replaced, and often unfits the reed for further use, whereas in my newly-invented reed, the separating-blades are easily replaced without damage to the reed, and the tubes $a$ being perfectly smooth the strands of the warp in their contact therewith pass without damage.

What I claim, and desire to secure by Letters Patent, is—

The reed consisting of the metal tubes $a$, having slots $e$, the dents or blades $c$, and protecting-rods $b$, the tubes being filled with lead or analogous substance, $d$, substantially as described.

MATHEW ASHE.

Witnesses:
KITTIE INGLIS,
JOHN INGLIS.